United States Patent [19]

Kassai

[11] Patent Number: 4,591,176
[45] Date of Patent: May 27, 1986

[54] LOCKING MECHANISM FOR PUSH-ROD OF BABY CARRIAGE

[75] Inventor: Kenzou Kassai, Osaka, Japan
[73] Assignee: Aprica Kassai Kabushikikaisha, Osaka, Japan
[21] Appl. No.: 680,275
[22] Filed: Dec. 10, 1984
[30] Foreign Application Priority Data Dec. 26, 1983 [JP] Japan ............................ 58-204643[U]

[51] Int. Cl.[4] .................................................. B62B 9/20
[52] U.S. Cl. ................................. 280/47.36; 280/642; 280/650; 280/658; 292/336.3
[58] Field of Search ................. 280/47.37 R, 643, 644, 280/650, 658, 47.36; 292/336.3, 347, 95, 101, 103, DIG. 27; 70/422

[56] References Cited

U.S. PATENT DOCUMENTS 1,611,940  12/1926  Ohmer ........................................ 70/422
4,506,907  3/1985  Miyagi ................................ 280/47.37 R Primary Examiner—John J. Love
Assistant Examiner—Karin L. Ferriter
Attorney, Agent, or Firm—W. G. Fasse; D. H. Kane, Jr.

[57] ABSTRACT

A locking mechanism for a push rod of a baby carriage is constructed to fix a push rod (12) in its face-to-back push state and face-to-face push state and comprises a hook (15) having an engaging recess adapted to fit on engaging pins erected on the baby carriage, and a knob (16) operable to rotate the hook (15). The knob (16) is slidable and is constantly urged by a spring (36a) toward the hook (15). The knob (16) has an engaging projection (31), while the hook (15) has an engaging recess (32) engageable with the engaging projection (31). When the engaging projection (31) and the engaging recess (32) are engaged with each other and when the rotation of the hook (15) is not inhibited, the rotation of the knob (16) causes the rotation of the hook (15). On the other hand, when the rotation of the hook (15) is inhibited by an engaging pin, the rotation of the knob (16) causes the knob (16) to slide away from the hook (15) against the force of the spring (36a), thereby canceling the engagement between the engaging projection (31) and the engaging recess (32).

4 Claims, 10 Drawing Figures

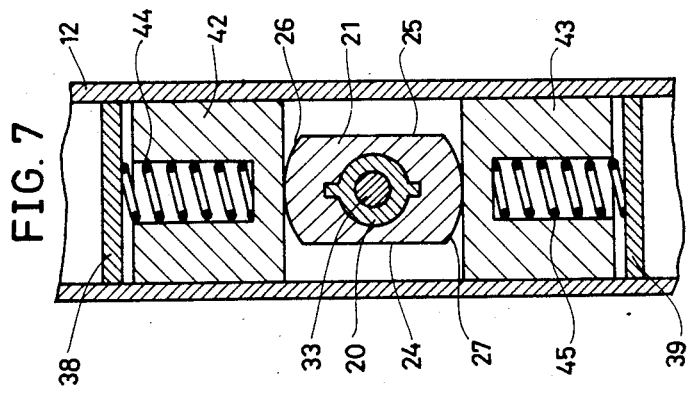
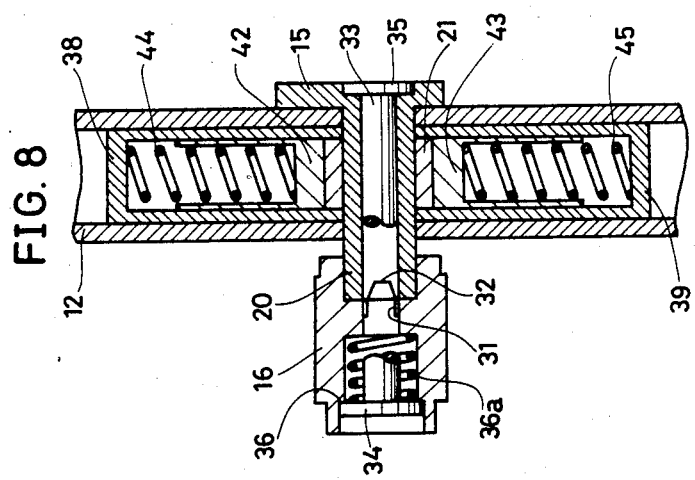

LOCKING MECHANISM FOR PUSH-ROD OF BABY CARRIAGE

BACKGROUND OF THE INVENTION

1. Field of the Invention

This invention relates to a locking mechanism whereby a push rod of a baby carriage, which is turnably installed can be fixed in the face-to-back push state and also in the face-to-face push state.

2. Description of the Prior Art

FIG. 1 is a side view showing an example of a baby carriage to which this invention is applied.

The arrangement of the entire baby carriage has nothing to do with the essence of this invention, but the outline thereof will be briefly described below.

A front leg 3 having a front wheel 2 and a rear leg 5 having a rear wheel 4 are attached to a longitudinally extending handrail 1. A seat support rod 6 for supporting a seat is mounted between the front and rear legs 3 and 5. Further, the rear leg 5 has a handrail support rod 8 attached thereto through a connecting member 7. The upper end of the handrail support rod 8 is attached to the handrail 1. An upwardly extending backrest support member 9 is turnably connected at its lower end to the rear end of the handrail 1. The backrest support member 9 can be fixed at a desired angle of inclination by adjusting a backrest angle adjusting lever 11 turnably connected to a bracket 10 fixed to the rear end of the handrail 1.

A push rod 12 which has direct bearing on this invention is used to move the baby carriage, and, for example, is turnably connected to the connecting member 7 through a pin 13. The purpose of turnably connecting the push rod 12 is to obtain the face-to-face push state in which the user pushes the baby carriage while looking at the baby's face, and the face-to-back push state in which the user pushes it while looking at the baby's back. The illustrated state is the face-to-face push state. On the other hand, the state shown in FIG. 2 is the face-to-back push state. The push rod 12 has to be fixed in position respectively for the face-to-back state and the face-to-face push state. To this end, a locking mechanism 14 is provided. The locking mechanism 14 comprises a hook 15 rotatably attached to the push rod 12, and a knob 16 rotatably attached to the push rod 12 so as to make it possible to rotate said hook 15. The hook 15 has an engaging recess 19 adapted to fit on engaging pins 17 and 18. One engaging pin 17 is erected on e.g., the upper portion of the front leg 3, while the other engaging pin 18 is erected on, e.g., the bracket 10 fixed to the rear end of the handrail 1. When the engaging recess 19 of the hook 15 fits on one engaging pin 17, the face-to-face push state of the push rod 12 (FIG. 1) is fixed, while when the engaging recess 19 of the hook 15 fits on the other engaging pin 18, the face-to-back push state (FIG. 2) is fixed.

The operation of changing the face-to-face push state shown in FIG. 1 to the face-to-back push state shown in FIG. 2 will now be described. In this case, first, it is necessary to disengage the engaging recess 19 of the hook 15 from one engaging pin 17. To this end, the knob 16 is turned counterclockwise as viewed in the figure. In response thereto, the hook 15 is rotated counterclockwise, with the result that the engagement between the engaging recess 19 and the engaging pin 17 is canceled. Thereafter, the push rod 12 is turned clockwise as viewed in the figure to engage the engaging recess 19 of the hook 15 with the other engaging pin 18. In this manner, the face-to-back push state shown in FIG. 2 is fixed. A similar operation will be performed when changing the face-to-back push state shown in FIG. 2 to the face-to-face push state shown in FIG. 1. More particularly, in this case, the knob 16 is rotated counterclockwise in FIG. 2 and then the push rod 12 is turned counterclockwise. And the engaging recess 19 of the hook 15 is engaged with one engaging pin 17, whereupon the face-to-face push state shown in FIG. 1 is obtained.

As is clear from the description given above, to cancel the engagement between the engaging hook 15 and the engaging pin 17 or 18, it is necessary to rotate the knob 16 in a predetermined direction. In the illustrated example, the predetermined direction is a counterclockwise direction. However, it can happen that the operator rotates the knob 16 in a direction opposite to the predetermined direction by mistake. In a conventional locking mechanism, this erroneous operation, if repeated many times, causes damage to the locking mechanism. That is, in the conventional locking mechanism, the knob 16 is integral with the hook 15. Thus, the hook 16 and knob 15 rotate in a unit. Now, a situation resulting from rotating the knob 16 in a direction opposite to the predetermined direction by mistake will be considered. In that case, since the hook 15 is inhibited by the presence of the engaging pin 17 or 18 from rotation, an excessive force will act on the connected region between the knob 16 and the hook 15. This phenomenon, if repeated a number of times, will lead to damage to the locking mechanism.

SUMMARY OF THE INVENTION

Accordingly, a principal object of this invention is to provide a locking mechanism for a push rod of a baby carriage, said mechanism being designed so that even if the operator rotated the knob in a direction opposite to the predetermined direction by mistake, damage can be avoided by allowing the knob alone to rotate idly.

In the locking mechanism for a push rod of a baby carriage according to this invention, the hook and knob are adapted to engage each other by means of a combination of an engaging projection and an engaging recess. Further, the knob is adapted to be slidable along the axis of rotation of the hook. The knob is constantly urged by a spring toward the hook. When the knob is slid toward the hook, said engaging projection and said engaging recess engage each other.

When the engaging projection and recess engage each other and when the rotation of the hook is not inhibited, the rotation of the knob causes the rotation of the hook with the rotation of the knob. On the other hand, when the engaging projection and recess engage each other and when the rotation of the hook is inhibited by an engaging pin, the rotation of the knob will cause the knob to move away from the hook against the force of the spring, thereby canceling the engagement between the engaging projection and recess.

With the arrangement described above, even if the operator rotates the knob in a direction opposite to the predetermined direction by mistake, the knob only rotates idly and no excessive force acts on the locking mechanism, so that there is no danger of damaging the locking mechanism.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3a is a perspective view of the knob shown in FIG. 3, sectioned through the middle;

FIG. 7 is a view similar to FIG. 5, but showing a state in which a block adapted to rotate along with the hook has been rotated about 90° from the state shown in FIG. 5;

FIG. 8 is a view similar to FIG. 6 except that the knob has been turned about 90°.

DESCRIPTION OF THE PREFERRED EXAMPLE EMBODIMENTS AND OF THE BEST MODE OF THE INVENTION

Figure 3:
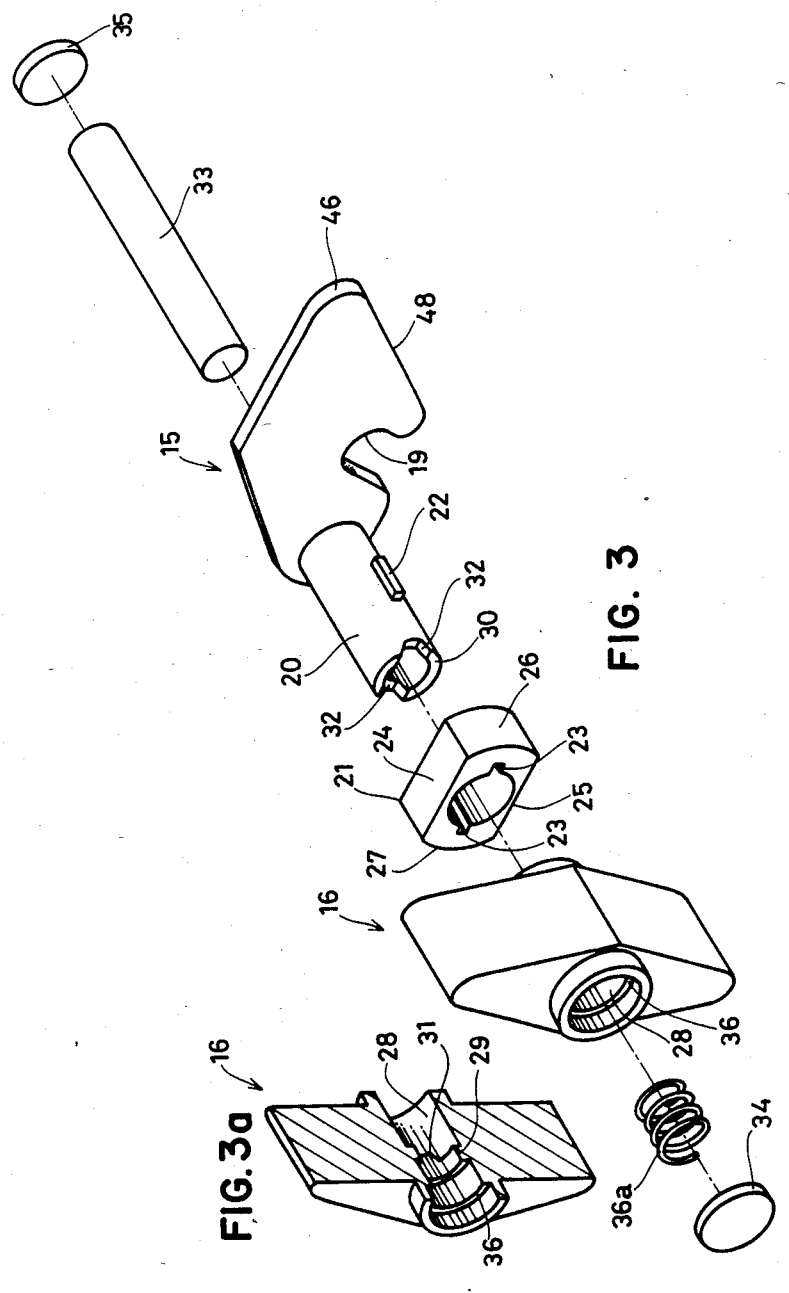
FIG. 3 is an exploded perspective view of main components of a locking mechanism according to this invention, showing such components as are directly associated with a hook and a knob.
Figure 5:
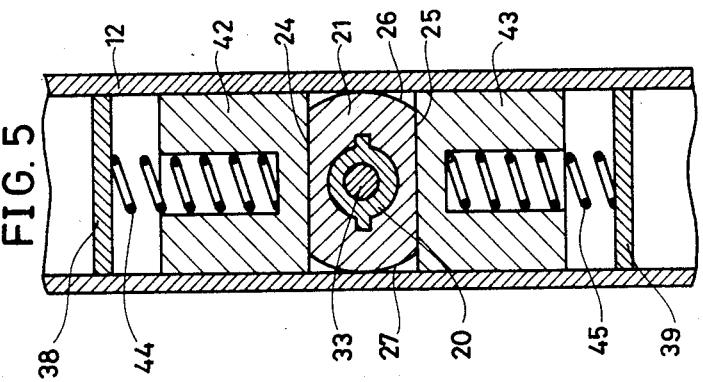
FIGS. 5 and 6 are sectional views showing, in combination, the components shown in FIG. 3 and the components shown in FIG. 4, FIG. 5 being taken along the line V—V of FIG. 4 and FIG. 6 being taken along the line VI—VI of FIG. 4.
Figure 6:
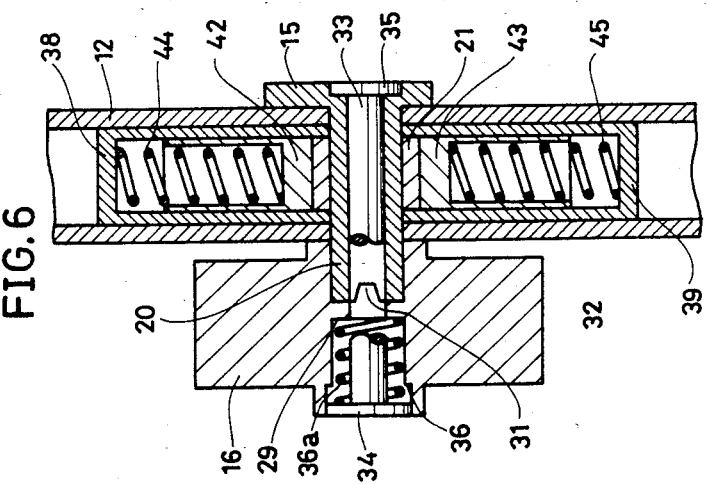

Referring to FIG. 3, the locking mechanism comprises a hook 15 rotatably attached to a push rod 12 (see FIGS. 4 to 6), and a knob 16 rotatably attached to the push rod 12 so as to make it possible to rotate the hook 15. As best shown in FIG. 6, the hook 15 is disposed on the rear surface of the push rod 12, while the knob 16 is disposed on the front side of the push rod 12.

As shown in FIG. 3, the hook 15 is formed with an engaging recess 19 capable of fitting on engaging pins erected on the baby carriage. Further, the hook 15 has a cylindrical portion 20 with a center axis coinciding with the axis of rotation of the hook 15. This cylindrical portion 20, as best shown in FIG. 6, extends through the push rod 12 from its rear surface to its front surface and is rotatably supported by the push rod 12. Further, mounted on the outer surface of the cylindrical portion 20 is a block 21 which is disposed in the push rod 12 and which is adapted to rotate with the hook 15. More particularly, two keys 22 are secured to the outer surface of the cylindrical portion 20, while the hole surface of the block 21 is formed with keyways 23 corresponding to the keys 22. Thus, if the block 21 is installed on the cylindrical portion 20 by fitting keys 22 in the keyways 23, the block 21 will rotate along with the hook 15. In addition, the outer peripheral surface of the block 21, as shown in FIG. 3, is defined preferably by a pair of parallel flat surfaces 24 and 25 and a pair of arcuate surfaces 26 and 27 connecting said pair of flat surfaces 24 and 25.

FIG. 3a is a perspective view of the knob 16 shown in FIG. 3 sectioned through the middle. As illustrated, the knob 16 has a hole 28 extending therethrough from its rear side, the right-hand side in the figure, to its front side, the left-hand side in the figure. Further, substantially the middle portion of the hole 28 has an inner flange 29 projecting inwardly throughout the inner periphery. The cylindrical portion 20 of the hook 15 is inserted into the hole 28 of the knob 16, the end of this insertion being defined by the front end surface 30 of the cylindrical portion 20 abutting against the inner flange 29 of the knob 16.

Further, the hook 15 and the knob 16 are adapted to engage each other through a combination of engaging projections and recesses. That is, the inner flange 29 of the knob 16 is formed with engaging projections 31 extending toward the rear side, as shown. The engaging projections 31 are preferably trapezoidal. On the other hand, trapezoidal engaging recesses 32 formed in the front end surface 30 of the cylindrical portion 20 of the hook 15 are associated with said engaging projections trapezoidal engaging recesses 32 formed in the front end surface 30 of the cylindrical portion 20 of the hook 15. Thus, when the cylindrical portion 20 of the hook 15 is inserted into the hole 28 of the knob 16 while the predetermined positional relation between the hook 15 and the knob 16 is maintained, the engaging recesses 32 in the hook 15 engage the engaging projections 31 on the knob 16. In addition, since the engaging projections 31 and the engaging recesses 32 have trapezoidal shapes complementary to each other, as described above, when they engage each other it follows that their inclined surfaces are in contact with each other.

Referring to FIGS. 3, 3a, and 6, the hook 15 and the knob 16 are connected together by a connecting rod 33 extending through the hole of the cylindrical portion 20 and the hole 28 of the knob 16. The front and rear end surfaces of the connecting rod 33 have fixed thereto heads 34 and 35, respectively, which are greater in diameter than the rod 33. Thus, the hook 15 and knob 16 are inhibited from separating from each other. The length of the connecting rod 33 is such as to allow the knob 16 to slide along the axis of rotation of the hook 15. That is, when the hook 15 and knob 16 are combined with each other while retaining their predetermined positional relation and when the connecting rod 33 is inserted, it is necessary that there be a clearance defined between the head 34 fixed to the front end surface of the connecting rod 33 and a step portion 36 formed on the inner peripheral surface which defines the hole 28 of the knob 16. This enables the knob 16 to slide forward until its step portion 36 abuts against the head 34 of the connecting rod 33. Further, as shown, a spring 36a is disposed between the head 34 of the connecting rod 33 and the inner flange 29 of the knob 16. Thus, the knob 16 is constantly urged by the spring 36a to slide toward the hook 15.

Figure 4:
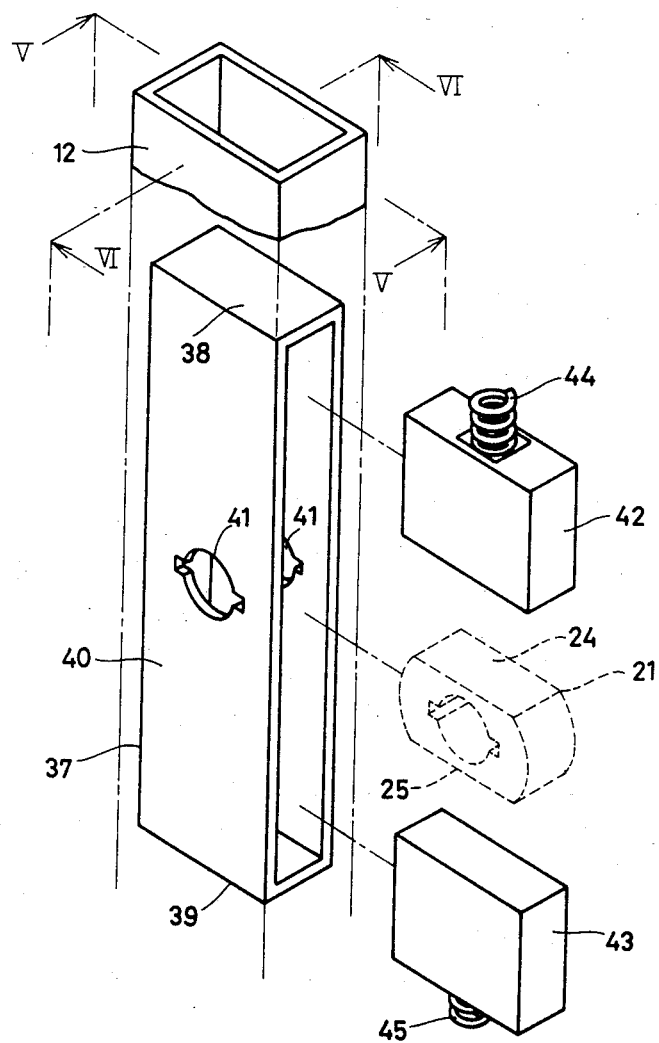
FIG. 4 is an exploded perspective view of the main components of the locking mechanism according to this invention, showing those components which are received in a push rod.

Referring to FIG. 4, the block 21 adapted to rotate along with the hook 15 is disposed in the push rod 12, as already described above, and in connection with this block 21 the following arrangement is preferably adopted.

First, a vertically elongated frame body 37 is disposed in the push rod 12. The frame body 37 has a top wall 38, a bottom wall 39 and side walls 40. The side walls 40 are formed with holes 41 for the cylindrical portion 20 of the hook 15 to extend therethrough. The aforesaid block 21 is installed in this frame body 37. Further, as is clear from FIGS. 4, 5 and 6 when examined together, a spring seat 42 of U-shaped cross-section is disposed between the block 21 housed in the frame body 37 and the top wall 38 of the frame body 37 and, similarly, a spring seat 43 of U-shaped cross-section is disposed between the block 21 and the bottom wall 39 of the frame body 37. The spring seats 42 and 43 are constantly urged by springs 44 and 45 to slide toward the block 21. The bottom surfaces of the spring seats 42 and 43 are flat surfaces. Thus, the block 21 is pressed by the bottom surfaces of the spring seats 42 and 43 disposed one above the other and is thereby constantly urged so that it will turn back to its stable state. The stable state referred to herein is a state in which the pair of flat surfaces 24 and 25 of the block 21 lie orthogonal to the direction of the length of the push rod 12, in which state the pair of flat surfaces 24 and 25 of the block 21 abut against the bottom surfaces of the spring seat 42 and 43, respectively.

The operation of the locking mechanism for a push rod of a baby carriage described above, will now be described.

Figure 1:
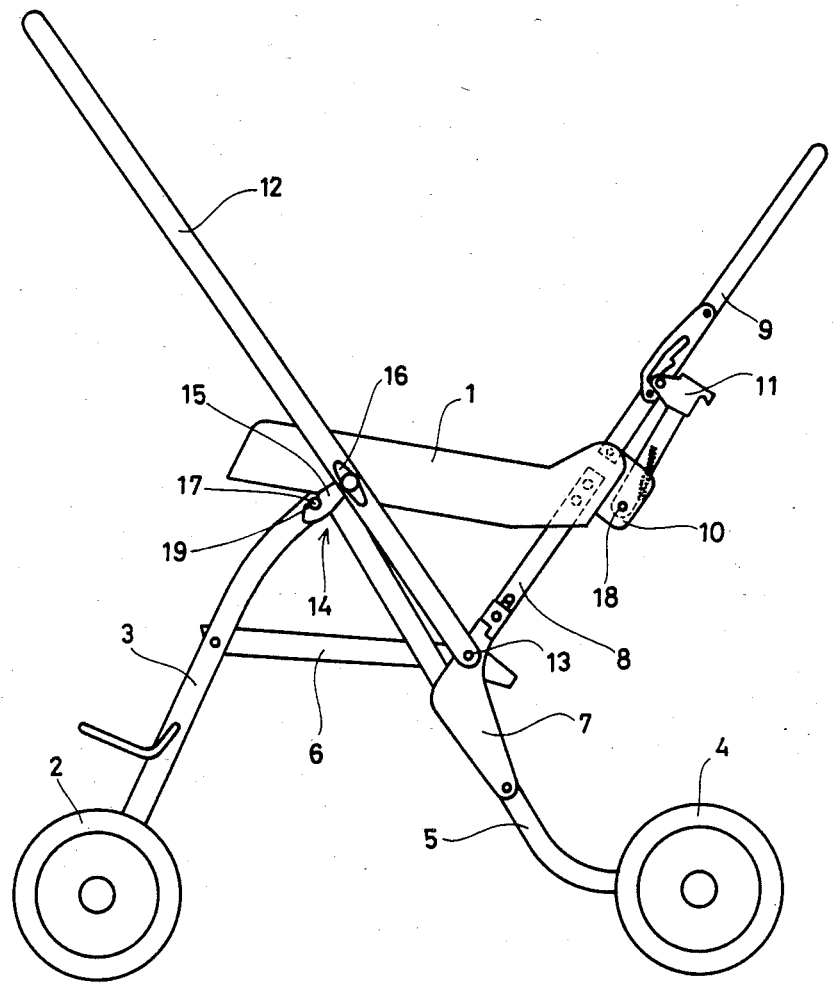
FIGS. 1 and 2 are side views showing an example of a baby carriage to which this invention is applied, FIG. 1 being a view taken when a push rod is fixed in its face-to-face push state, and FIG. 2 being a view taken when the push rod is fixed in its face-to-back push state.
Figure 2:
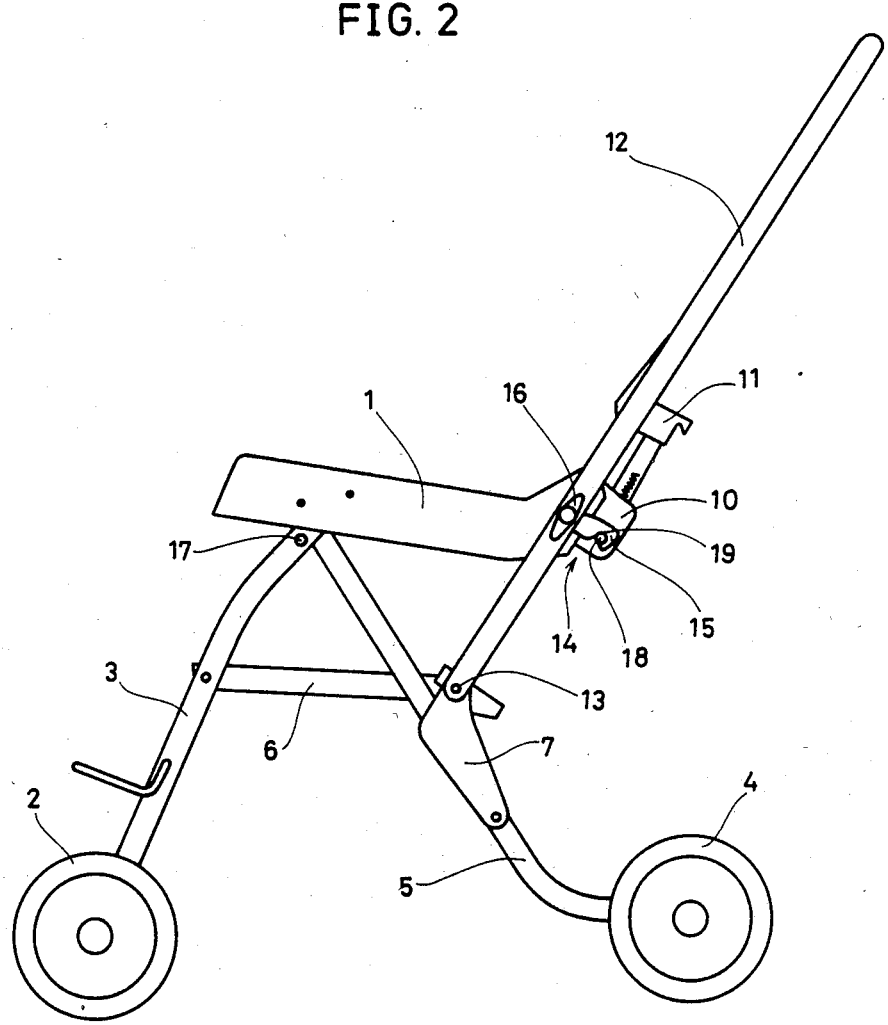

Assume that the push rod 12 of the baby carriage is fixed in its face-to-back push state, as shown in FIG. 2. Thus, the engaging recess 19 of the hook 15 fits on the engaging pin 18 erected on the baby carriage. At this time, the internal state of the locking mechanism 15 is as shown in FIGS. 5 and 6. That is, the knob 16 and hook 15 are in such a positional relation that the engaging projections 31 on the knob 16 and the engaging recesses 32 in the hook 15 snugly engage each other. In addition, the engagement between the engaging projections 31 and recesses 32 is firmly held by the spring 36a. Further, the block 21 which rotates with the hook 15 assumes a state in which its pair of flat surfaces 24 and 25 are orthogonal to the direction of the length of the push rod 12.

To cancel the fixed state of the push rod 12 shown in FIG. 2, the knob 16 of the locking mechanism is rotated in a counterclockwise direction as viewed in the figure. Thereupon, the hook 15, which now engages the knob 16 through the engaging projections and recesses 31 and 32, is rotated counterclockwise in response to the rotation of the knob 16. Thus, the engagement between the engaging recess 19 of the hook 15 and the engaging pin 18 erected on the baby carriage is canceled and so is the fixed state of the push rod 12.

In addition, since the block 21 is adapted to rotate with the hook 15, as described above, the block 21 rotates in response to the rotation of the knob 16. If, therefore, the knob 16 is rotated about 90°, the flat surfaces 24 and 25 extend substantially in parallel to the direction of the length of the push rod 12, as shown in FIG. 7. At this time, the pair of arcuate surfaces 26 and 27 abut against the bottom surfaces of the spring seats 42 and 43, respectively.

The state of the block 21 shown in FIG. 7 is an unstable state. That is, the state of contact between the block 21 and the spring seats 42 and 43 is not a state of contact between flat surfaces such as the one shown in FIG. 5, but is one of contact between arcuate and flat surfaces, and since the spring seats 42 and 43 are constantly urged by the respective springs 44 and 45 to slide toward the block 21, it follows that if the block 21 rotates clockwise or counterclockwise even slightly from the state shown in FIG. 7, it will automatically turn back until it assumes the stable state. When the knob 16 of the locking mechanism 14 is rotated counterclockwise through 180° from the state shown in FIG. 2, the hook 15 of the locking mechanism 14 becomes capable of engaging the engaging pin 17 erected on the front leg 3, whereby the internal state of the locking mechanism of the baby carriage becomes substantially the same as the state shown in FIGS. 5 and 6.

The movement which occurs when the operator rotates the knob 16 in a direction opposite to the predetermined direction by mistake, will now be described. This is the movement which takes place when the operator rotates the knob 16 clockwise in FIG. 2. In this case, the rotation of the hook 15 is inhibited by the engaging pin 18. Referring to FIG. 6, if therefore, the knob 16 is rotated clockwise, the inclined surfaces of the engaging projections 31 on the knob 16 slide on the inclined surfaces of the engaging recesses 32 formed in the cylindrical portion 20 of the hook 15, whereby the knob 16 slides away from the hook 15 against the force of the spring 36a. The state resulting from idly turning the knob 16 through about 90° is shown in FIG. 8. As shown, the engagement between the engaging projections 31 and the engaging recesses 32 has been canceled.

Thus, even if the operator rotates the knob 16 in a direction opposite to the predetermined direction by mistake, the arrangement allowing the knob 16 alone to idly rotate prevents an excessive force from acting on the locking mechanism. In other words, there is no danger of the locking mechanism being damaged by an erroneous operation.

In addition, in order to make it easier for the engaging recesses 19 of the hook 15 to fit on the engaging pin 17 or 18 erected on the baby carriage, the hook 15 preferably has the following configuration. This will now be described with reference to FIG. 9.

Figure 9:
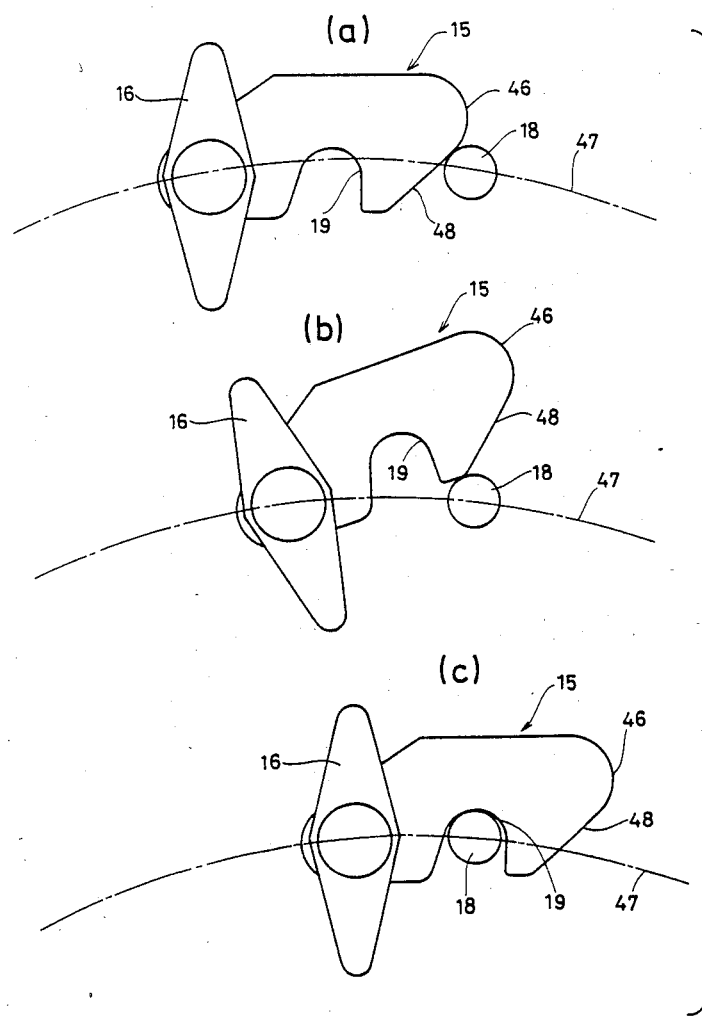
FIG. 9 is a view showing successive movements involved in establishing the engagement between the engaging recess of the hook and an engaging pin erected on a baby carriage.

FIG. 9 is a view showing successive movements involved in establishing the engagement between the engaging recess 19 of the hook 15 and the engaging pin 18 erected on the baby carriage. As shown, the hook 15 is shaped so that its contour extending from the exit of the engaging recess 19 to the front end 46 of the hook defines an inclined surface 48 obliquely crossing an arcuate path of movement 47 traveled by the hook 15 as the push rod 12 is turned. Thus, if the push rod is turned until the inclined surface 48 of the hook 15 abuts against the engaging pin 18 erected on the baby carriage, as shown at (a) in FIG. 9, and then if the push rod is further turned in the same direction, the hook 15, as shown at (b), rotates counterclockwise as viewed in FIG. 9 while keeping its inclined surface 48 in slide contact with the engaging pin 18. As the push rod is further rotates in the same direction, the hook 15 rotates counterclockwise in FIG. 9 until the engaging recess 19 fits on the engaging pin 18, as shown at (c) in FIG. 9. Thus, if the hook 15 is rotated in advance in the predetermined direction, simply turning the push rod results in the engaging recess 19 of the hook 15 automatically fitting on the engaging pin 17 or 18 erected on the baby carriage.

The locking mechanism for a push rod of a baby carriage described above and illustrated in the drawings is one of the preferred embodiments of this invention. However, various changes and modifications are possible. Some of such changes and modifications are given below by way of example.

In the above embodiment, in order to establish the engagement between the hook 15 and the knob 16, the hook 15 is provided with the engaging recesses 31 while the knob 16 is provided with the engaging projections 31. However, a reverse arrangement is possible; that is, the front end surface 30 of the cylindrical portion 20 of the hook 15 may be provided with engaging projections while providing the inner flange 29 of the knob 16 with engaging recesses. In short, it is only necessary that the hook 15 and the knob 16 be capable of engaging each other through a combination of engaging projections and recesses.

The block 21 adapted to rotate with the hook 15 is not absolutely necessary. As is clear from what has been described so far, by employing the block 21 and its associated arrangement, an advantage is obtained that the hook 15 can be held in the predetermined positional relation. The object of this invention is not to keep the hook 15 in the predetermined positional relation but to provide a locking arrangement which enables the knob 16 to be idly rotated when the knob is rotated in a reverse direction by mistake; thus, the arrangement associated with the block 21 is not an indispensable structural requisite.

Similarly, the inclined surface 48 of the hook 15 described with reference to FIG. 9 is not absolutely necessary, although it provides an advantage that the engaging recess 19 and the engaging pin 17 or 18 can be fitted together in a simple operation.

Although the present invention has been described and illustrated in detail, it is clearly understood that the same is by way of illustration and example only and is not to be taken by way of limitation, the scope of the present invention being limited only by the terms of the appended claims.

What is claimed is:

1. In a locking mechanism for fixing a push rod (12) of a baby carriage in its face-to-back push state and also in its face-to-face push state, having a hook (15) turnably attached to said push rod (12) and having an engagng recess (19) adapted to fit on engaging pins (17, 18) erected on the baby carriage, and a knob (16) turnably attached to said push rod (12) so as to make it possible to rotate said hook (15), the improvement comprising a combination of an engaging projection (31) and an engaging recess (32) for engaging said hook (15) and said knob (16) with each other, said knob (16) being slidable along the axis of rotation of said hook (15), spring means (36a) for constantly urging said knob (16) toward said hook (15), so that when said knob (16) is slid until it approaches said hook (15), said engaging projection (31) and said engaging recess (32) engage each other, wherein when said engaging projection (31) and said engaging recess (32) engage each other and when the rotation of said hook (15) is not inhibited, the rotation of said knob (16) causes said hook (15) to rotate in response to the rotation of said knob (16), while when said engaging projection (31) and said engaging recess (32) engage each other and when the rotation of said hook (15) is inhibited by said engaging pin (17 or 18), the rotation of said knob (16) results in said knob (16) sliding away from said hook (15) against the force of said spring means (36a), whereby the engagement between said engaging projection (31) and said engaging recess (32) is canceled.

2. The locking mechanism of claim 1, wherein said knob (16) is provided with said engaging projection (31), while said hook (15) is provided with said engaging recess (32), said engaging projection (31) having an inclined surface,
said engaging recess (31) having an inclined surface which abuts against said inclined surface of said engaging projection (31) when said engaging projection (31) and said engaging recess (32) are engaged with each other, whereby
when the rotation of said hook (15) is inhibited by said engaging pin (17 or 18), the rotation of said knob (16) causes the inclined surface of said engaging projection (31) to slide on the inclined surface of said engaging recess (32).

3. The locking mechanism of claim 1, wherein said hook (15) has a block (21) disposed in said push rod (12) and adapted to rotate with said hook (15), said block (21) having an outer peripheral surface comprising a pair of parallel surfaces (24, 25) and a pair of arcuate surfaces (26, 27) connecting said pair of parallel surfaces (24, 25), and spring means (44, 45) arranged in said push rod for constantly urging said block (21) back to its stable state, i.e., a state in which said pair of flat surfaces (24, 25) are orthogonal to the direction of the length of said push rod (12), the arrangement being such that when said block (21) is in its stable state, the engaging recess (19) of said hook (15) and the engaging pin (17 or 18) are in such a positional relation as to be capable of engaging each other.

4. The locking mechanism of claim 1, wherein said hook (15) is shaped to that its contour extending from an exit of its engaging recess (19) to the front end of the hook defines on inclined surface (48) obliquely crossing an arcuate path (47) to be traveled by said hook (15) as the push rod (12) is turned.

* * * * *

UNITED STATES PATENT AND TRADEMARK OFFICE
CERTIFICATE OF CORRECTION

PATENT NO. : 4,591,176

DATED : May 27, 1986

INVENTOR(S) : Kenzou Kassai

It is certified that error appears in the above-identified patent and that said Letters Patent is hereby corrected as shown below:

Claim 4, Column 8, line 45, replace "to" by --so--;

line 47, replace "on" by --an--.

Signed and Sealed this

Nineteenth Day of August 1986

[SEAL]

Attest:

DONALD J. QUIGG

Attesting Officer

Commissioner of Patents and Trademarks